United States Patent
Wetzel et al.

(10) Patent No.: US 8,122,171 B2
(45) Date of Patent: Feb. 21, 2012

(54) BUS ENUMERATION IN A SYSTEM WITH MULTIPLE BUSES

(75) Inventors: Mark R. Wetzel, Cedar Park, TX (US); Robert D. Ross, Austin, TX (US); Eric R. Gardiner, Leander, TX (US); Richard C. Thrapp, Austin, TX (US)

(73) Assignee: National Instruments Corporation, Austin, TX (US)

( * ) Notice: Subject to any disclaimer, the term of this patent is extended or adjusted under 35 U.S.C. 154(b) by 116 days.

(21) Appl. No.: 12/408,574

(22) Filed: Mar. 20, 2009

(65) Prior Publication Data

US 2010/0241781 A1    Sep. 23, 2010

(51) Int. Cl.
*G06F 13/00* (2006.01)
*G06F 9/00* (2006.01)

(52) U.S. Cl. ............. 710/104; 710/313; 713/1; 713/100
(58) Field of Classification Search .................. 710/313
See application file for complete search history.

(56) References Cited

U.S. PATENT DOCUMENTS

| | | | |
|---|---|---|---|
| 5,748,980 A | 5/1998 | Lipe et al. | |
| 5,978,860 A * | 11/1999 | Chan et al. | 710/8 |
| 6,065,081 A * | 5/2000 | Stancil et al. | 710/104 |
| 6,141,708 A * | 10/2000 | Tavallaei et al. | 710/62 |
| 6,360,291 B1 * | 3/2002 | Tavallaei | 710/306 |
| 6,647,434 B1 * | 11/2003 | Kamepalli | 710/14 |
| 6,662,242 B2 | 12/2003 | Holm et al. | |
| 6,792,490 B2 * | 9/2004 | Tavallaei | 710/104 |
| 6,810,452 B1 * | 10/2004 | James et al. | 710/104 |
| 6,959,395 B2 * | 10/2005 | Ma | 713/310 |
| 6,970,986 B1 | 11/2005 | Mahmoud | |
| 6,973,525 B2 | 12/2005 | Dennis et al. | |
| 6,985,990 B2 | 1/2006 | Bronson et al. | |
| 6,996,658 B2 | 2/2006 | Brocco et al. | |
| 7,062,581 B2 | 6/2006 | Brocco et al. | |
| 7,146,452 B2 | 12/2006 | Brocco et al. | |
| 7,421,532 B2 * | 9/2008 | Stewart et al. | 710/315 |
| 7,640,426 B2 * | 12/2009 | Garney | 713/2 |
| 2002/0178317 A1 | 11/2002 | Schmisseur et al. | |
| 2003/0097503 A1 * | 5/2003 | Huckins | 710/104 |
| 2005/0289283 A1 | 12/2005 | Warrier et al. | |
| 2006/0149873 A1 * | 7/2006 | Underwood et al. | 710/104 |
| 2007/0130453 A1 * | 6/2007 | Lewites | 713/1 |
| 2007/0234130 A1 | 10/2007 | Sullivan et al. | |
| 2010/0088547 A1 * | 4/2010 | Chang | 714/36 |

* cited by examiner

*Primary Examiner* — Ryan Stiglic
(74) *Attorney, Agent, or Firm* — Meyertons Hood Kivlin Kowert & Goetzel, P.C.

(57) ABSTRACT

Enumerating an expanded bus system in a system. The expanded bus system may include a first bus, a bridge coupled to the first bus, and a second bus coupled to the bridge, where the second bus includes one or more downstream bus ports. One or more of the downstream bus ports may initially be masked. An initial bus enumeration may be performed during system boot, which may not include enumerating the masked bus ports. After the initial bus enumeration, the masked bus ports may be unmasked. An operating system may re-enumerate the bus system, which may include enumerating the no-longer-masked bus ports.

28 Claims, 3 Drawing Sheets

BUS ENUMERATION IN A SYSTEM WITH MULTIPLE BUSES

FIELD OF THE INVENTION

The present invention relates generally to computer systems, and more particularly to a system and method for enumerating buses in a system with multiple buses.

DESCRIPTION OF THE RELEVANT ART

Computer systems frequently rely on one or more bus systems to provide expansion capabilities. Exemplary buses are peripheral component interface (PCI) or PCI express (PCIe) buses, as well as USB (Universal Serial Bus), etc. A system will typically have a set number of bus ports, providing expansion capability (allowing a hardware device to be coupled to the system at each bus port) up to that number of bus ports. In the process of booting the system up, system firmware, such as a basic input/output system (BIOS) will typically perform a bus enumeration to detect and identify any buses in the system and any devices coupled to the bus(es), and allocate system resources accordingly.

It is often desirable to expand beyond the original number of buses or bus ports of a system. There are various devices that allow a secondary bus to be coupled to a bus system, such as a PCI bridge or a PCIe switch, among others. However, it is often the case that the firmware of a system is not properly configured to detect buses beyond its original bus system. In this case, the system firmware may not properly enumerate the bus system, and may cause the system to halt altogether. Accordingly, improvements in bus enumeration are desired.

SUMMARY OF THE INVENTION

Embodiments are presented of a system and method for enumerating downstream bus ports in a system. As many types of system booting firmware are unable to properly enumerate expanded bus systems, the system and method described herein are provided as a way to overcome these system firmware shortcomings, with the intention of enabling a system to operate normally with an expanded bus system regardless of the system firmware of that system.

The system may include a processor and one or more memory mediums coupled to the processor; the system may also include a first bus coupled to the processor, a bridge coupled to the first bus, and a second bus coupled to the bridge. Each of the first bus and the second bus may be either a peripheral component interface (PCI) bus or a PCI express (PCIe) bus according to various embodiments. The first bus and the second bus may each include one or more bus ports (e.g., slots to connect to a PCI bus or ports of a PCIe bus); the bus ports in the second bus may be considered 'downstream bus ports', as they are downstream of the bridge in the system hierarchy. The system may further include various software for performing the method as described below according to various embodiments.

The method may include masking one or more downstream bus ports in the system. There may be a means to enable initial masking of the system; for example, software means (e.g., bridge firmware which may be configured to enable or disable initial bus masking) or hardware means (e.g., a manual switch to enable or disable initial bus masking, such as a DIP switch). The downstream port(s) may be masked in any of a number of ways, and may be masked by the bridge, or in some embodiments, may be masked by an external device (which may also be part of the system, e.g., may be external to the bridge, but may be part of the system).

An initial bus enumeration may be performed during system boot; for example, system firmware may perform the initial enumeration. The initial bus enumeration may not discover and/or recognize the masked bus ports or any hardware devices coupled to the masked bus ports due to one or more masking techniques; thus the initial bus enumeration may only enumerate and allocate system resources for a subset of the bus ports in the system. For example, in one embodiment, the initial bus enumeration may enumerate only the bus ports on the first bus. After the system firmware has completed its system booting tasks (e.g., including the initial bus enumeration), it may pass control of the system to an operating system (OS). The OS may call and load a device driver, e.g., for the bridge and/or for the second bus.

After the initial bus enumeration, the masked downstream bus port(s) may be unmasked. The driver may initiate (and may in some embodiments also perform) the unmasking. The driver may either initiate or may actually perform the unmasking depending on how the masked downstream bus port(s) were initially masked. The driver unmasking the previously masked downstream bus port(s) may thus enable any devices coupled to those downstream bus port(s) to be configured for normal operation.

Once the previously masked downstream bus port(s) are no longer masked, the system may be re-enumerated. This may include the device driver directing or instructing the OS to re-enumerate the bus(es); alternatively, the OS may be configured to perform a bus re-enumeration without direction from the device driver The OS, and in some embodiments the OS in combination with the device driver, may accordingly re-enumerate some or all of the buses and bus ports in the system and allocate (or re-allocate) system resources, thereby configuring the bus system including any hardware devices coupled to the bus system for normal operation.

Another embodiment may include the device driver, e.g., may include a computer readable memory medium including program instructions executable to unmask one or more downstream bus ports and direct an OS to re-enumerate the system bus including the one or more downstream bus ports.

BRIEF DESCRIPTION OF THE DRAWINGS

A better understanding of the present invention can be obtained when the following detailed description of the preferred embodiment is considered in conjunction with the following drawings, in which.

Figure 1A:
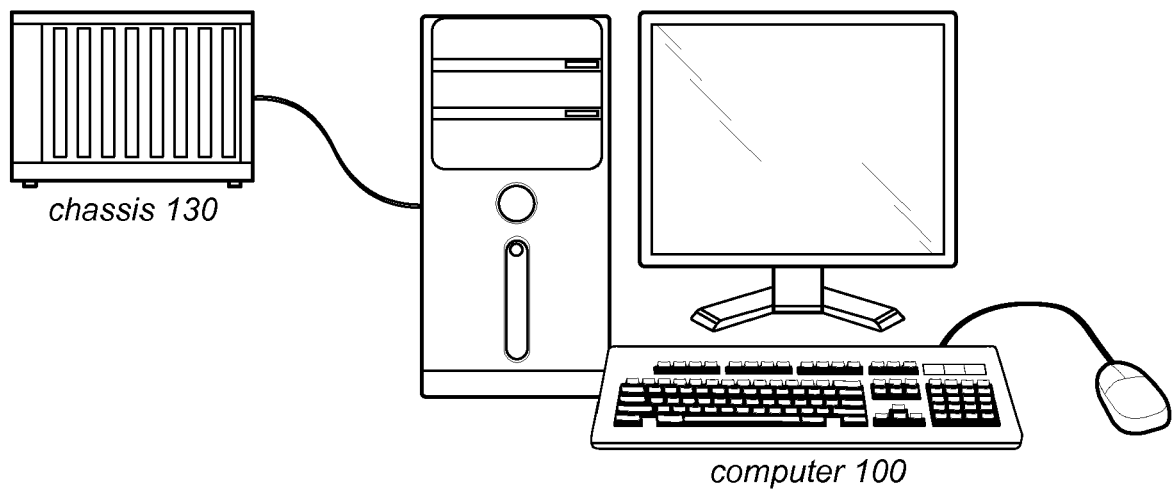
FIGS. 1A and 1B illustrate exemplary embodiments of a system including a first bus and a second bus.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, flash memory, optical storage, PROM, EPROM, or EEPROM. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Figure 1B:
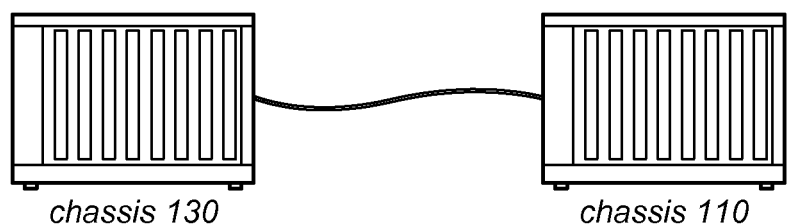

FIGS. 1A and 1B—Exemplary System Including a Primary Bus and a Secondary Bus

FIGS. 1A and 1B illustrate exemplary embodiments of a system including a primary bus and a secondary bus. The system may include a computer system such as computer system 100, as shown in FIG. 1A. The computer system 100 may include a first bus. The computer system 100 may be coupled to a second bus, for example housed in chassis 130. The computer system 100 may include a bridge device coupled to the first bus which interfaces to the second bus. As shown in FIG. 1B, an alternate embodiment may include a first chassis 110 housing a first bus, coupled to a second chassis 130 housing a second bus. The first chassis 110 may comprise a controller, i.e., a computer on a plug-in card inside the chassis. The first chassis 110 may also include a bridge device coupled to the first bus which interfaces to the second bus in the second chassis 130. In addition to the embodiments shown, any number of other embodiments of a system including a first bus and a second bus are also possible; for example, the first bus and the second bus may both be housed in a computer system; or, the first bus and the second bus may both be housed in the same chassis, which may be coupled to a computer system.

Figure 2:
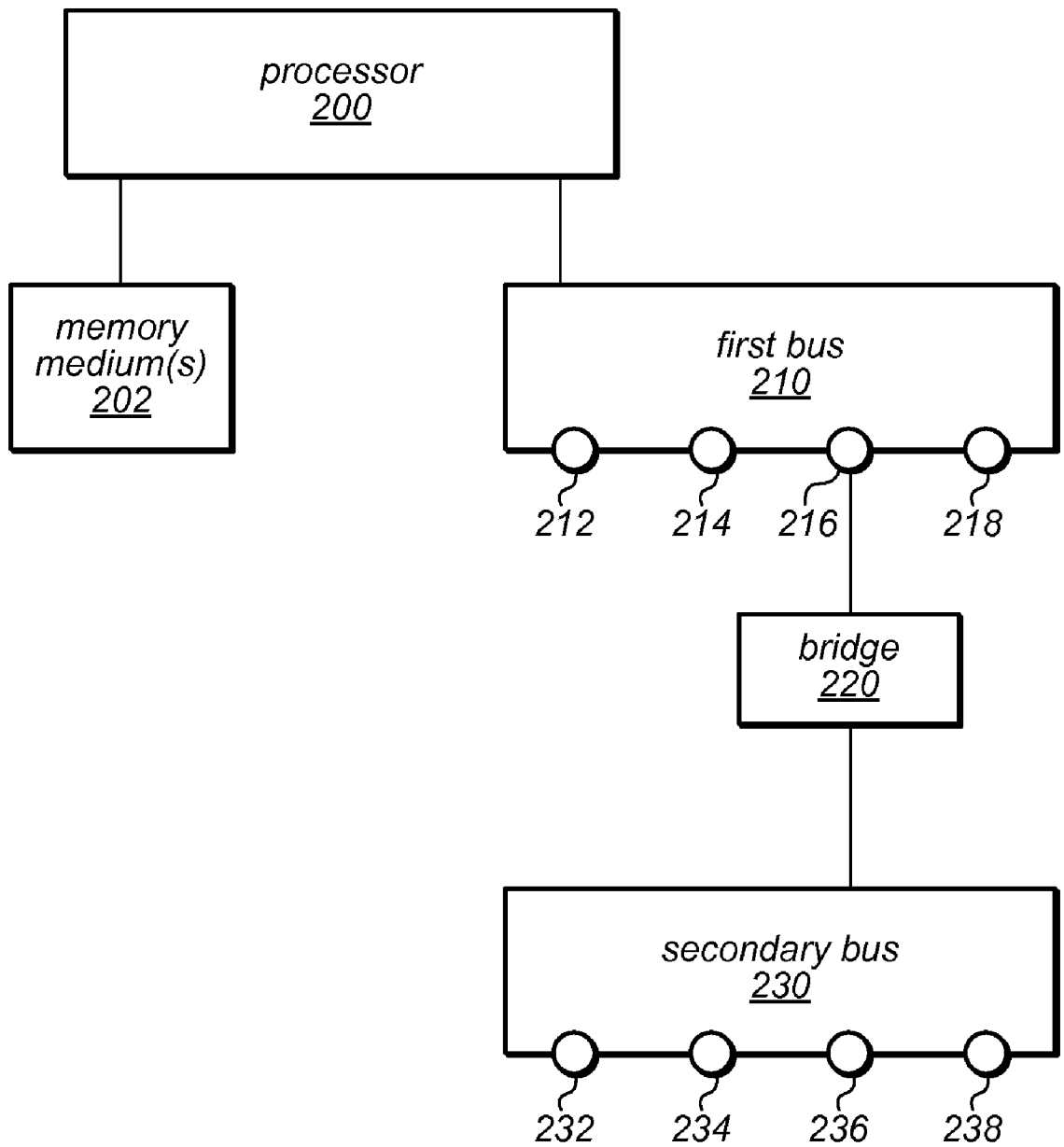
FIG. 2 is a block diagram illustrating a system including a first bus and a second bus according to one embodiment.

FIG. 2—Exemplary System Including a First and a Second Bus

FIG. 2 is a block diagram of a system including a first bus and a second bus. The system may include a processor 200 and one or more memory mediums 202 coupled to the processor. The memory mediums 202 may include any of the types of memory described above. For example, in one embodiment there may be one or more chips, such as a programmable read-only memory (PROM), an electrically erasable PROM (EEPROM), an erasable PROM (EPROM), and/or a flash memory chip, with system firmware for booting up the system. There may also be a hard drive, optical drive, or other non-volatile storage, which may for example include software, such as an OS, one or more device drivers, and any other programs as desired. The system may include additional types of memory mediums coupled to (or comprised in) the processor, such as system main memory, and/or processor cache and registers, among others.

The processor 200 may be coupled to a first bus 210. The first bus 210 may be a peripheral component interface (PCI) bus or a PCI express (PCIe) bus. The first bus may include a fixed number of expansion slots for adding hardware devices; there may be four slots 212, 214, 216, 218 as shown, however alternate embodiments may include other (e.g., greater or smaller) numbers of slots. Depending on the type of bus, the slots may operate in a parallel manner on the bus (e.g., a PCI bus) or may act as ports with point-to-point serial links (e.g., PCIe ports) on the bus. In general, each expansion slot on a bus will be referred to as a "bus port" herein, which term may thus refer to either a PCI bus or a PCIe port. It should be noted that the first bus 210 may not be directly coupled to the processor 200; that is, the first bus 210 may be indirectly coupled to the processor, e.g., there may be one or more components coupled between the processor and the first bus, such as a chipset.

The system may include a bridge 220 coupled to one of the bus ports of the first bus, such as bus port 216 in FIG. 2, of the first bus 210. The bridge 220 may be any sort of device that allows a second bus 230 to be coupled to the first bus 210, and through the first bus to the processor 200. For example, the bridge 220 may be a PCI bridge, a PCIe switch, a PCIe-PCI bridge, or a PCI-PCIe bridge. The bridge 220 may be coupled to a second bus 230, which may be also be a PCI or a PCIe bus. Note that the first bus and the second bus may or may not be the same type of bus; thus one embodiment might include a PCIe bus as the second bus, coupled to a PCI-PCIe bridge, coupled to a PCI bus as the first bus. The second bus 230 may also include a fixed number of bus ports. For example, there may be four bus ports 323, 234, 236, 238 as shown, or there may be a different (e.g., greater or smaller) number of bus ports. Thus the second bus 230 may provide additional hardware expansion capability to the system. In some embodiments the second bus may be included as part of the bridge The system may include all of the above described components in a single housing, e.g., a computer case. In various other embodiments, one or more components may be in different housings; for example, the first bus may be in the same chassis as the processor and memory medium while the second bus may be in another chassis; or the first bus may be in a separate chassis from the processor and memory, while the second bus may be in another separate chassis; other embodiments are also possible.

According to various embodiments, the system may also include any number of other components, e.g., any hardware or software components such as a keyboard, mouse, monitor, speakers, or other components typical of a computer system. In some embodiments the system may be part of a measurement system, e.g., including hardware and/or software components for control, measurement, and/or data acquisition (DAQ) systems. Other types of systems including other components are also envisioned. However, elements of a system not required for understanding of the present invention have been omitted for clarity.

Figure 3:
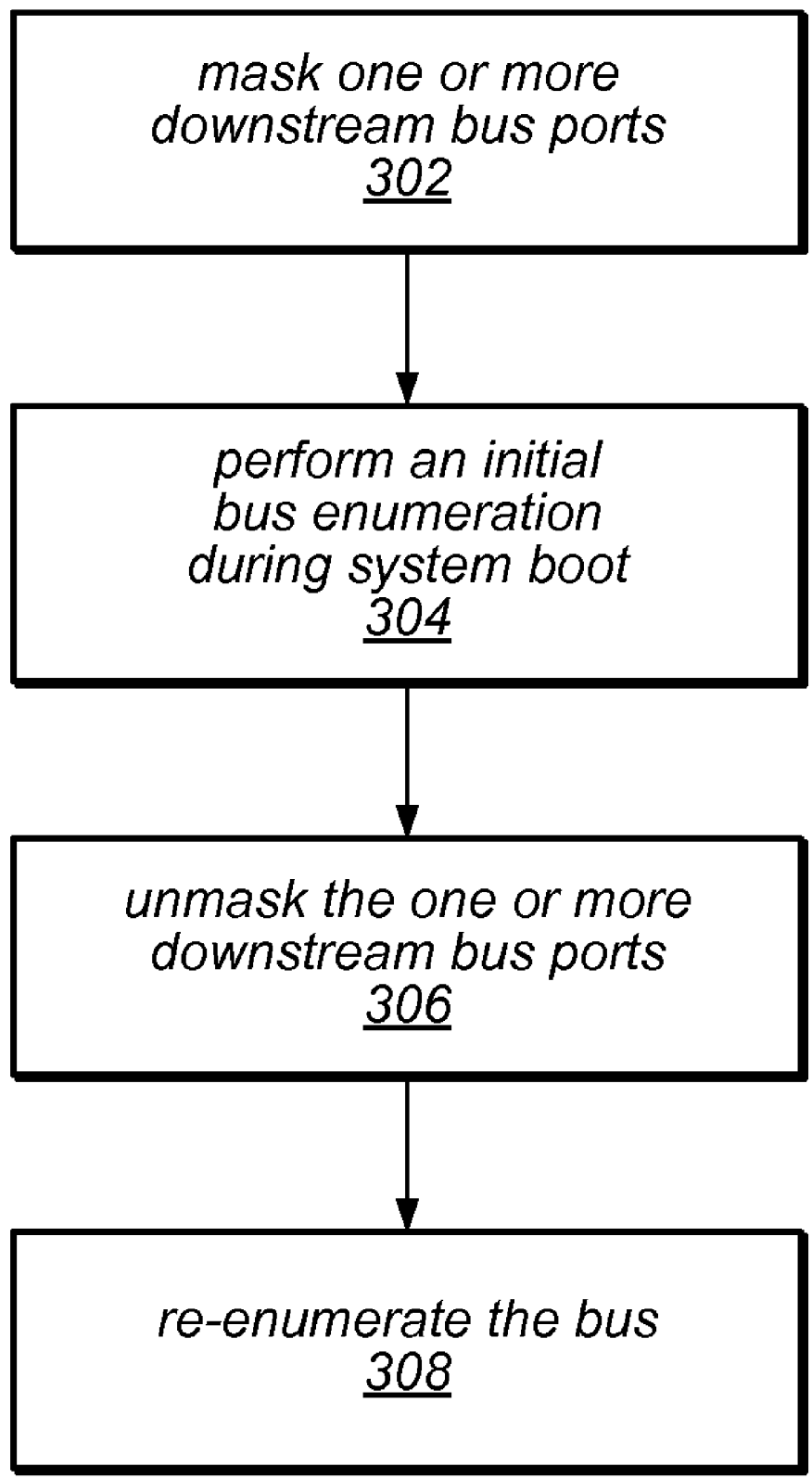
FIG. 3 is a flowchart diagram illustrating a method to enumerate buses in a system with multiple buses, according to one embodiment.

FIG. 3—Flowchart Illustrating a Method to Enumerate Buses in a System

FIG. 3 is a flowchart diagram illustrating an exemplary method to enumerate buses in a system. The system may be any of the systems of FIGS. 1A, 1B, and 2, according to various embodiments. That is, the system may include a processor, one or more memory mediums coupled to the processor, a first bus coupled to the processor, a bridge coupled to the first bus, and a second bus coupled to the bridge. As used herein, any bus ports on the secondary bus may be referred to as 'downstream bus ports', as being 'downstream' of the bridge, while the bus port of the first bus to which the bridge is coupled may be referred to as an 'upstream bus port'.

In 302, one or more downstream bus ports are masked. In various embodiments, some or all of the downstream bus ports may be masked; for example, in a second bus with four bus ports (as shown in FIG. 2), one, two, three, or all of the downstream bus ports may be masked, as desired. A user may initially enable bus masking for one or more downstream bus ports. Once enabled, initial bus masking may be permanently enabled; alternatively, in a preferred embodiment, there may be means to enable or disable initial bus masking. In one embodiment, this may be done in software, e.g., by configuring bridge firmware to mask the downstream bus port(s). For example, the user may be able to provide input to a program specifying that initial masking of one or more downstream bus ports be enabled (or disabled); the program may then configure the bridge firmware (or other device firmware) to enable (or disable) initial masking of those downstream bus ports. Alternatively, there may be manual switch, such as a DIP switch, coupled to the system, which may be manually switched by the user, thereby enabling (or disabling) bus masking for one or more downstream bus ports.

When masking of one or more downstream bus ports is enabled, the downstream bus port(s) may be masked in any of a number of ways. In many cases, the bridge may be operable to mask the downstream bus port(s). The bridge may be able to mask the downstream bus port(s) by overwriting the configuration registers of the downstream bus port(s), or by disabling the downstream bus ports, or by disabling a communication link to the one or more downstream bus ports. Some embodiments may alternatively or additionally include an external device operable to disable the communication link. An alternate embodiment includes changing the header of the upstream bus port, masking the bridge itself (and thereby masking any downstream bus ports). Each of these ways of masking the downstream bus port(s) are described in further detail below; however, regardless of which method is used to mask the downstream bus port(s), each method may serve to hide the masked bus ports and any devices coupled to the masked bus ports such that they may not be detected (e.g., by system firmware) while masked.

In 304, an initial bus enumeration is performed during system boot. When the system is powered on, system firmware (such as a basic input-output system (BIOS) or an extensible firmware interface (EFI)) may perform initial booting procedures. The system firmware may be located on a memory medium, as noted. Among these booting procedures may be a bus enumeration, during which any buses in the system and any devices coupled to those buses may be detected and identified, and system resources, such as bus numbers, memory space, and I/O space, may be allocated.

For many systems, the system firmware is limited in its ability to detect bus systems beyond a certain size; for example, an off-the-shelf system might include a first bus and system firmware configured to detect a bus system as big as the first bus. However, the system might require additional expansion capabilities, in which case a second bus may be coupled to the first bus (e.g., through a bridge, as described above with respect to FIG. 2). When system firmware encounters a bus system larger than it is configured to enumerate, it may encounter problems, and may potentially cause the system to fail. Thus it may in some cases be desirable, at least initially, to hide the expanded system from the system firmware. Thus in step 304, the initial bus enumeration may include enumerating the first bus and allocating system resources accordingly, however, it may not include enumerating the one or more masked downstream bus ports.

As noted above, the downstream bus port(s) may be masked in any of a number of ways. In one embodiment the bridge may mask the downstream bus port(s) by overwriting their configuration registers. The bridge may for example overwrite the configuration registers to all 1's (or all F's in hexadecimal). In this way, a master abort condition is simulated. Alternatively, the bridge may block access to the configuration registers. In either case, the system firmware does not enumerate the downstream bus port(s).

In another embodiment, the bridge may mask the downstream bus port(s) by disabling them. For example, the bridge may be a PCI bridge, and may disable its secondary (downstream) bus. Alternatively, the bridge may be a PCIe switch, and may disable one or more of its downstream ports. For example, in one embodiment a PCIe switch may include one or more configuration bits for each downstream port, which control whether that port is enabled; the PCIe switch may further include logic (such as a complex programmable logic device (CPLD)) operable to disable (or enable) any given port using these configuration bits. Disabling the downstream bus port(s) may cause an attempted query by the system firmware to return an unsupported request, and the system firmware does not enumerate the downstream bus port(s).

In some embodiments, the bridge may mask the downstream bus port(s) by changing the header of the upstream bus port to a type 0 header. This may cause the upstream bus port to appear as an endpoint, thereby masking the bridge and any bus ports downstream of the bridge entirely.

In still another embodiment, the bridge may mask the downstream bus port(s) by disabling the communication link to the downstream bus port(s). In some embodiments, this may be done internally within the bridge, e.g., by one or more configuration bits in a PCIe switch. Alternatively, this form of masking may be performed externally (e.g., not by the bridge). For example, there may be an external device operable to disable the communication link. One example of such an external device could be a PCIe buffer/repeater with an enable or disable pin. Thus, in the disable state, it would block the electrical signals. Another possible example is a signal switch, which could be used to disconnect or connect an upstream and downstream component, thereby disabling or enabling communication. In either case (e.g., whether the bridge or an external device is responsible), by disabling the communication link, the system firmware is prevented altogether from communicating with the masked downstream bus port(s), and does not enumerate the downstream bus port(s).

In 306, the one or more downstream bus ports are unmasked. Once the system firmware has finished with its system boot tasks, including bus enumeration, it passes control to an operating system (OS). In one embodiment, once the OS has control of (e.g., once the OS begins loading in) the system, the one or more downstream bus ports may be unmasked. In another embodiment, the one or more downstream bus ports may be unmasked before the OS begins loading (e.g., at any time after the initial bus enumeration). The unmasking may be initiated by a driver, e.g., software usable to interact with the bridge and/or other hardware in the system. The driver may be called and loaded before, at the same time as, or after the OS takes control of the system; in a preferred embodiment, the driver may be loaded at the same time that the OS is loaded in the system. In some embodiments, the one or more downstream bus ports may be unmasked before the OS has finished loading, e.g., before the OS has fully configured the system. The driver may unmask the downstream bus port(s) in any of various ways depending on how the downstream bus port(s) were masked. Thus if the configuration registers of the downstream bus port(s) were overwritten (or access to them was blocked), the driver may restore (or allow access to) the configuration registers. If the downstream bus port(s) were disabled, the driver may direct the bridge to enable the downstream bus port(s). If the communication link of the downstream bus port(s) was disabled (either internally by the bridge or with an external device), the driver may direct the bridge or the external device to enable the communication link. Thus, the one or more downstream bus ports may be unmasked (e.g., by the driver) such that they and any devices coupled to them are configured for normal operation.

In 308, the bus is re-enumerated. After unmasking the one or more downstream bus ports, the driver may in some embodiments direct the OS to re-enumerate the bus. Alternatively, or in addition, after unmasking the one or more downstream bus ports, the driver may re-enumerate the bus. Thus the OS, or the driver, or in some embodiments both the OS and the driver, may re-enumerate the bus system. The bus re-enumeration may include the entire bus system e.g., including all bus ports and devices attached thereto on both the first bus and the second bus; alternatively, only the previously masked bus port(s) (which were not enumerated in the initial bus enumeration) may be enumerated at this time. The OS may then re-allocate system resources accordingly. In various embodiments, either the OS alone, or the OS together with the driver, may perform this re-allocation of system resources.

Although the bus re-enumeration may be performed in any number of ways as described above, the following example is provided for illustrative purposes as one possible embodiment. In this particular embodiment, the driver may first re-enumerate all the buses in the system, and calculate the resources used by each device in the bus system while the OS waits for the driver. The driver may then instruct the OS to continue loading. The driver may wait while the OS performs its own re-enumeration and begins assigning system resources. Once the OS is in the process of re-enumerating the system, the driver may assist the OS in assigning resources according to the calculations already performed by the driver. Once the bus system has been properly re-enumerated and resources have been allocated, the entire bus system may be configured to operated normally.

Thus, by masking or hiding (or preventing access to) one or more downstream bus ports in the system for the initial bus enumeration, system firmware may encounter a bus system within its ability to properly enumerate, and may enumerate and assign resources to the reduced bus system it can see. System failure and/or other problems that could potentially be caused by the system firmware attempting to enumerate a larger or more complex system than it is configured to may thereby be avoided. Once the system firmware finishes its initial booting procedures, the full bus hierarchy may be revealed (or access thereto may again be granted), allowing the OS to re-enumerate the bus system and assign resources to all devices in the hierarchy, providing for the full functionality of the entire bus system.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for enumerating one or more downstream bus ports in a system, comprising:
    masking the one or more downstream bus ports in the system, wherein the system comprises a first bus, a bridge, and a second bus, wherein the bridge is coupled to the first bus at an upstream bus port, and wherein the bridge is coupled to the second bus, wherein the second bus comprises the one or more downstream bus ports;
    performing the initial bus enumeration for the system during system boot after said masking, wherein the initial bus enumeration enumerates and allocates system resources to one or more upstream ports comprised in the first bus, wherein the one or more downstream bus ports are not enumerated and corresponding system resources are not allocated to the one or more downstream ports during the initial bus enumeration due to said masking;
    unmasking the one or more downstream bus ports after said performing the initial bus enumeration;
    re-enumerating the second bus after said unmasking, wherein said re-enumerating enumerates and allocates system resources to the one or more downstream bus ports.

2. The method of claim 1,
    wherein said masking comprises the bridge overwriting configuration registers of the one or more downstream bus ports;
    wherein said unmasking comprises a driver restoring the configuration registers.

3. The method of claim 1,
    wherein said masking comprises the bridge disabling the one or more downstream bus ports;
    wherein said unmasking comprises a driver enabling the one or more downstream bus ports.

4. The method of claim 1,
    wherein said masking comprises disabling a communication link to the one or more downstream bus ports;
    wherein said unmasking comprises enabling the communication link to the one or more downstream bus ports.

5. The method of claim 1, wherein the first bus and the second bus each comprise one of:
    a peripheral component interface (PCI) bus; or
    a PCI express (PCIe) bus.

6. The method of claim 1, wherein the bridge comprises one of:
    a PCI bridge; or
    a PCIe switch;
    a PCIe-PCI bridge;
    a PCI-PCIe bridge.

7. The method of claim 1, wherein said masking is performed by the bridge.

8. The method of claim 1, wherein said unmasking is performed by a driver.

9. The method of claim 1, wherein said initial bus enumeration is performed by system firmware.

10. The method of claim 1,
    wherein the initial bus enumeration comprises allocating one or more of 1) bus numbers; 2) memory space; and/or 3) I/O space to each of one or more upstream bus ports comprised in the first bus; and wherein re-enumerating the second bus comprises allocating one or more of 1) bus numbers; 2) memory space; and/or 3) I/O space to each of the one or more downstream bus ports.

11. A system, comprising:
a processor;
a first bus coupled to the processor;
a bridge coupled to the first bus at an upstream bus port
a second bus coupled to the bridge, wherein the second bus comprises one or more downstream bus ports;
wherein the one or more downstream bus ports in the system are initially masked;
one or more memory mediums coupled to the processor, wherein the memory mediums comprises program instructions executable to:
perform the initial bus enumeration for the system during system boot, wherein the initial bus enumeration enumerates and allocates system resources to one or more upstream ports comprised in the first bus, wherein the one or more downstream bus ports are not enumerated and corresponding system resources are not allocated to the one or more downstream ports during the initial bus enumeration;
unmask the one or more downstream bus ports after the initial bus enumeration; and
re-enumerate the second bus after unmasking the one or more downstream bus ports;
wherein said re-enumerating enumerates and allocates system resources to the one or more downstream bus ports.

12. The system of claim 11, further comprising:
a manual switch, wherein the manual switch is configured to enable or disable initial masking of the one or more downstream bus ports.

13. The system of claim 11, wherein the memory mediums further comprise program instructions executable to:
receive first user input specifying that initial masking of the one or more downstream bus ports is enabled;
enable initial masking of the one more downstream bus ports in response to the first user input;
receive second user input specifying that initial masking of the one or more downstream bus ports is disabled;
disable initial masking of the one or more downstream bus ports in response to the second user input.

14. The system of claim 11,
wherein the bridge is operable to initially mask the one or more downstream bus ports by overwriting configuration registers of the one or more downstream bus ports;
wherein said unmasking comprises restoring the configuration registers.

15. The system of claim 11,
wherein the bridge is operable to initially mask the one or more downstream bus ports by disabling the one or more downstream bus ports;
wherein said unmasking comprises enabling the one or more downstream bus ports.

16. The system of claim 11,
wherein one of:
a) the bridge; or
b) an external device;
is operable to initially mask the one or more downstream bus ports by disabling a communication link to the one or more downstream bus ports;
wherein said unmasking comprises enabling the communication link to the one or more downstream bus ports.

17. The system of claim 11, wherein the first bus and the second bus each comprise one of:

a peripheral component interface (PCI) bus; or
a PCI express (PCIe) bus.

18. The system of claim 11, wherein the bridge comprises one of:
a PCI bridge; or
a PCIe switch;
a PCIe-PCI bridge;
a PCI-PCIe bridge.

19. The system of claim 11,
wherein the initial bus enumeration comprises allocating one or more of 1) bus numbers; 2) memory space; and/or 3) I/O space to each of one or more upstream bus ports comprised in the first bus; and
wherein re-enumerating the second bus comprises allocating one or more of 1) bus numbers; 2) memory space; or 3) I/O space to each of the one or more downstream bus ports.

20. A system, comprising:
a processor;
a first bus coupled to the processor;
a bridge coupled to the first bus at an upstream bus port;
a second bus coupled to the bridge, wherein the second bus comprises one or more downstream bus ports;
means for enabling initial masking the one or more downstream bus ports in the system;
means for performing the initial bus enumeration for the system during system boot, wherein the initial bus enumeration enumerates and allocates system resources to one or more upstream ports comprised in the first bus, wherein the one or more downstream bus ports are not enumerated and corresponding system resources are not allocated to the one or more downstream ports during the initial bus enumeration due to the initial masking;
means for unmasking the one or more downstream bus ports after the initial bus enumeration; and
means for re-enumerating the second bus after operation of the means for unmasking;
wherein said re-enumerating enumerates and allocates system resources to the one or more downstream bus ports.

21. The system of claim 20, wherein the means for enabling initial masking of the one or more downstream bus ports in the system comprise a manual switch.

22. The system of claim 20, wherein the means for enabling initial masking of the one or more downstream bus ports in the system comprise program instructions executable to:
receive first user input specifying that initial masking of the one or more downstream bus ports is enabled;
enable initial masking of the one more downstream bus ports in response to the first user input.

23. The system of claim 20,
wherein the initial bus enumeration comprises allocating one or more of 1) bus numbers; 2) memory space; and/or 3) I/O space to each of one or more upstream bus ports comprised in the first bus; and
wherein re-enumerating the second bus comprises allocating one or more of 1) bus numbers; 2) memory space; or 3) I/O space to each of the one or more downstream bus ports.

24. A non-transitory computer readable memory medium comprising program instructions to enable enumeration of one or more downstream bus ports in a system, wherein the program instructions are executable to:
unmask the one or more downstream bus ports, wherein the one or more downstream bus ports are provided by a bridge, wherein the bridge is coupled to an upstream bus port of a first bus;

wherein the one or more downstream bus ports were masked for the initial bus enumeration of the first bus during system boot, wherein the initial enumeration did not enumerate the one or more downstream bus ports and corresponding system resources were not allocated to the one or more downstream ports;

indicate, after unmasking the one or more downstream bus ports, to an operating system in the system, that the operating system may enumerate the one or more downstream bus ports, wherein enumeration operates to enumerate and allocate system resources for the one or more downstream bus ports.

25. The non-transitory computer readable memory medium of claim 24, wherein the program instructions are comprised in a device driver in the system.

26. The non-transitory computer readable memory medium of claim 24, wherein the program instructions are further executable to:

direct, after unmasking the one or more downstream bus ports, the operating system to re-enumerate the one or more downstream bus ports, wherein re-enumeration operates to enumerate and allocate system resources for the one or more downstream bus ports.

27. The non-transitory computer readable memory medium of claim 24, wherein the program instructions are further executable to:

re-enumerate, after unmasking the one or more downstream bus ports, the one or more downstream bus ports, wherein re-enumeration operates to enumerate and calculate system resources for the one or more downstream bus ports.

28. The non-transitory computer readable memory medium of claim 24, wherein the initial bus enumeration comprises allocating one or more of 1) bus numbers; 2) memory space; and/or 3) I/O space to each of one or more upstream bus ports comprised in the first bus; and wherein enumerating the one or more downstream bus ports comprises allocating one or more of 1) bus numbers; 2) memory space; and/or 3) I/O space to each of the one or more downstream bus ports.

* * * * *